(12) United States Patent
Adams et al.

(10) Patent No.: US 10,036,485 B2
(45) Date of Patent: Jul. 31, 2018

(54) DUAL SEAL FIRE SAFE STEM PACKING ORIENTATION

(71) Applicant: GE Oil & Gas Pressure Control LP, Houston, TX (US)

(72) Inventors: Keith Adams, Houston, TX (US); Travis McEvoy, Houston, TX (US); Andrew Browne Helvenston, Houston, TX (US); Lloyd Cheatham, Houston, TX (US); Robert Kevin Law, Houston, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 57 days.

(21) Appl. No.: 15/160,777

(22) Filed: May 20, 2016

(65) Prior Publication Data
US 2016/0265686 A1 Sep. 15, 2016

Related U.S. Application Data

(63) Continuation-in-part of application No. 14/090,026, filed on Nov. 26, 2013, now Pat. No. 9,347,585.

(51) Int. Cl.
*F16K 41/04* (2006.01)
*F16K 3/02* (2006.01)
(Continued)

(52) U.S. Cl.
CPC ............ *F16K 41/04* (2013.01); *E21B 33/068* (2013.01); *E21B 34/02* (2013.01); *F16K 3/0236* (2013.01);
(Continued)

(58) Field of Classification Search
CPC ...... F16K 41/08; F16K 41/083; F16K 41/086; F16K 41/04; F16K 41/02; F16K 3/243;
(Continued)

(56) References Cited

U.S. PATENT DOCUMENTS 589,725 A * 9/1897 Hodge .................... F16K 41/02
251/214
3,096,070 A * 7/1963 Wolfensperger ...... F16K 41/026
116/DIG. 18
(Continued)

FOREIGN PATENT DOCUMENTS

| CN | 201925592 U | 9/2011 |
| FR | 2260048 A1 | 8/1975 |
| JP | 6081370 U | 6/1985 |

OTHER PUBLICATIONS

International Search Report and Written Opinion issued in connection with corresponding PCT Application No. PCT/US2017/033891 dated Aug. 9, 2017.

*Primary Examiner* — Matthew W Jellett
(74) *Attorney, Agent, or Firm* — Hogan Lovells US LLP

(57) ABSTRACT

A valve with a packing assembly can include a first stem packing circumscribing a first portion of a valve stem, forming a seal between the valve stem and a valve body assembly, and being located in the second bore portion. A first packing retainer can have a collar that limits axial movement of the first stem packing and a first retainer body defining an inner cavity. A second stem packing can circumscribe a second portion of the valve stem and be located in the inner cavity of the first packing retainer. A second packing retainer can limit axial movement of the second stem packing. A piston member can be located axially between the first stem packing and the second stem packing, the piston member being moveable to apply axial force to one of the first stem packing and the second stem packing.

20 Claims, 4 Drawing Sheets

(51) Int. Cl.
*F16K 31/12* (2006.01)
*E21B 34/02* (2006.01)
*E21B 33/068* (2006.01)

(52) U.S. Cl.
CPC ......... *F16K 31/12* (2013.01); *Y10T 137/6069* (2015.04)

(58) Field of Classification Search
CPC ................ F16K 3/0227; F16K 3/0236; Y10T 137/6069; F16J 15/188; F16J 15/18; F16J 15/24; F16J 15/26; F16J 15/28
See application file for complete search history.

(56) References Cited

U.S. PATENT DOCUMENTS

| | | |
|---|---|---|
| 3,257,095 A | 6/1966 | Siver |
| 3,958,592 A | 5/1976 | Wells |
| 4,262,690 A | 4/1981 | Binegar |
| 4,577,873 A | 3/1986 | Baumann |
| 4,623,152 A * | 11/1986 | St Jean ................ F16J 15/188 277/518 |
| 5,076,175 A | 12/1991 | Whatley, II |
| 5,190,264 A | 3/1993 | Boger |
| 5,238,252 A | 8/1993 | Stewen |
| 5,263,682 A | 11/1993 | Covert |
| 5,375,812 A | 12/1994 | Kent |
| 6,202,668 B1 | 3/2001 | Maki |
| 6,997,437 B2 | 2/2006 | Mitten |
| 2005/0082766 A1 | 4/2005 | Lovell |
| 2013/0061954 A1 | 3/2013 | Giove et al. |
| 2013/0161553 A1 | 6/2013 | Hunter |
| 2014/0138082 A1* | 5/2014 | Meyberg ................ E21B 34/02 166/97.1 |
| 2015/0144823 A1 | 5/2015 | Helvenston et al. |

\* cited by examiner

DUAL SEAL FIRE SAFE STEM PACKING ORIENTATION

CROSS REFERENCE TO RELATED APPLICATION

This application is a continuation in part, and claims priority to and the benefit of, co-pending U.S. application Ser. No. 14/090,026, now U.S. Pat. No. 9,347,585 filed Nov. 26, 2013, titled "Dual Seal Fire Safe Stem Packing Orientation," the full disclosure of which is hereby incorporated herein by reference in its entirety for all purposes.

BACKGROUND

1. Field of the Disclosure

The present disclosure relates in general to valve bonnets and more particularly, to valve bonnet seals for use with oil, gas and other fluids.

2. Description of Related Art

A gate valve has a body with a central chamber that is intersected by a flow passage. A gate moves within the chamber between the open and closed positions. The gate has a hole through it that aligns with the flow passage while in the open position. A stem extends into engagement with the gate for moving the gate between open and closed positions. In one type, the stem has a first end that extends through a bonnet of the valve body assembly and a second end that extends into rotatable engagement with a threaded nut or sleeve secured to the gate. Rotating the stem causes the gate to move linearly. In another type, the stem does not rotate. Instead a threaded nut or sleeve mounted in the bonnet engages the stem, and when rotated, causes the stem to move linearly.

In gate valves, and in other valves with stems that rotate or move linearly, a stem packing is typically located in the bonnet and engages the stem to seal pressure within the chamber. Valves which are designed to work within a defined fire envelope must be capable of providing both high integrity normal operation well control and emergency pressure containment in the event of a fire. A single metal to metal seal that can meet both of these demands can require special coatings and can be very expensive and technically difficult to design and implement, especially on rotary valves. In addition, a single seal does not provide redundancy in the case of the failure of the seal.

SUMMARY OF THE DISCLOSURE

Embodiments of the current disclosure provide a system and method relating to a stem packing with seal redundancy that is capable of providing both a high integrity seal during normal operation well control and also emergency pressure containment in the event of a fire or other type of packing failure. Embodiments of the current disclosure have robust capabilities for both normal operations and for emergency pressure containment in the event of a fire without significantly increasing the overall height of the valve body assembly and without significantly increasing the cost of the stem packing components, compared to a stem packing that is only capable of functioning during normal operations.

In an embodiment of this disclosure, a valve having a packing assembly can include a valve body assembly defining a flow passage and a body cavity perpendicular to the flow passage. The valve body assembly further defines a bore extending from an exterior of the valve body assembly into the body cavity, the bore having a second bore portion with an enlarged diameter defined by an inner surface of the bore. A valve stem extends from the body cavity to an exterior of the valve body assembly through the bore for moving a valve member from the closed position to an open position, the valve stem having an axis. A first stem packing circumscribes a first portion of the valve stem, forming a seal between the valve stem and the valve body assembly, and being located in the second bore portion. A first packing retainer has a collar that limits axial movement of the first stem packing, and has a first retainer body defining an inner cavity. A second stem packing circumscribes a second portion of the valve stem and is located in the inner cavity of the first packing retainer. A second packing retainer limits axial movement of the second stem packing. A piston member is located axially between the first stem packing and the second stem packing, the piston member being moveable to apply axial force to one of the first stem packing and the second stem packing.

In another embodiment of the current disclosure, a packing assembly for sealing an annular space between a valve stem with an axis and a valve body assembly includes a first packing retainer having a collar with a first end surface, and a first retainer body defining an inner cavity with a bottom surface, the collar having a smaller outer diameter than the first retainer body. A first stem packing is located axially between the first end surface of the collar of the first packing retainer and the valve body assembly, forming a seal between the valve stem and the valve body assembly. A fire resistant stem packing is located in the inner cavity of the first packing retainer. A second packing retainer limits axial movement of the fire resistant stem packing. A piston member is located axially between the first stem packing and the second stem packing, the piston member being moveable to apply axial force to one of the first stem packing and the second stem packing.

In yet another embodiment of the current application, a method of sealing a valve with a packing assembly includes providing a valve having: a valve body assembly defining a flow passage and a body cavity perpendicular to the flow passage, the valve body assembly further defining a bore extending from an exterior of the valve body assembly into the body cavity, the bore having an second bore portion with an enlarged diameter defined by an inner surface of the bore; and a valve stem extending from the body cavity to an exterior of the valve body assembly through the bore for moving a valve member from the closed position to an open position, the valve stem having an axis. A first portion of the valve stem is circumscribed with a first stem packing, forming a seal between the valve stem and the valve body assembly in the second bore portion. Axial movement of the first stem packing is limited with a first packing retainer having a collar and having a first retainer body defining an inner cavity. A second portion of the valve stem is circumscribed with a second stem packing located in the inner cavity of the first packing retainer. Axial movement of the second stem packing is limited with a second packing retainer. A piston member is located axially between the first stem packing and the second stem packing, the piston member being moveable to apply axial force to one of the first stem packing and the second stem packing.

BRIEF DESCRIPTION OF DRAWINGS

Some of the features and benefits of the present disclosure having been stated, others will become apparent as the description proceeds when taken in conjunction with the accompanying drawings, in which.

Figure 1:
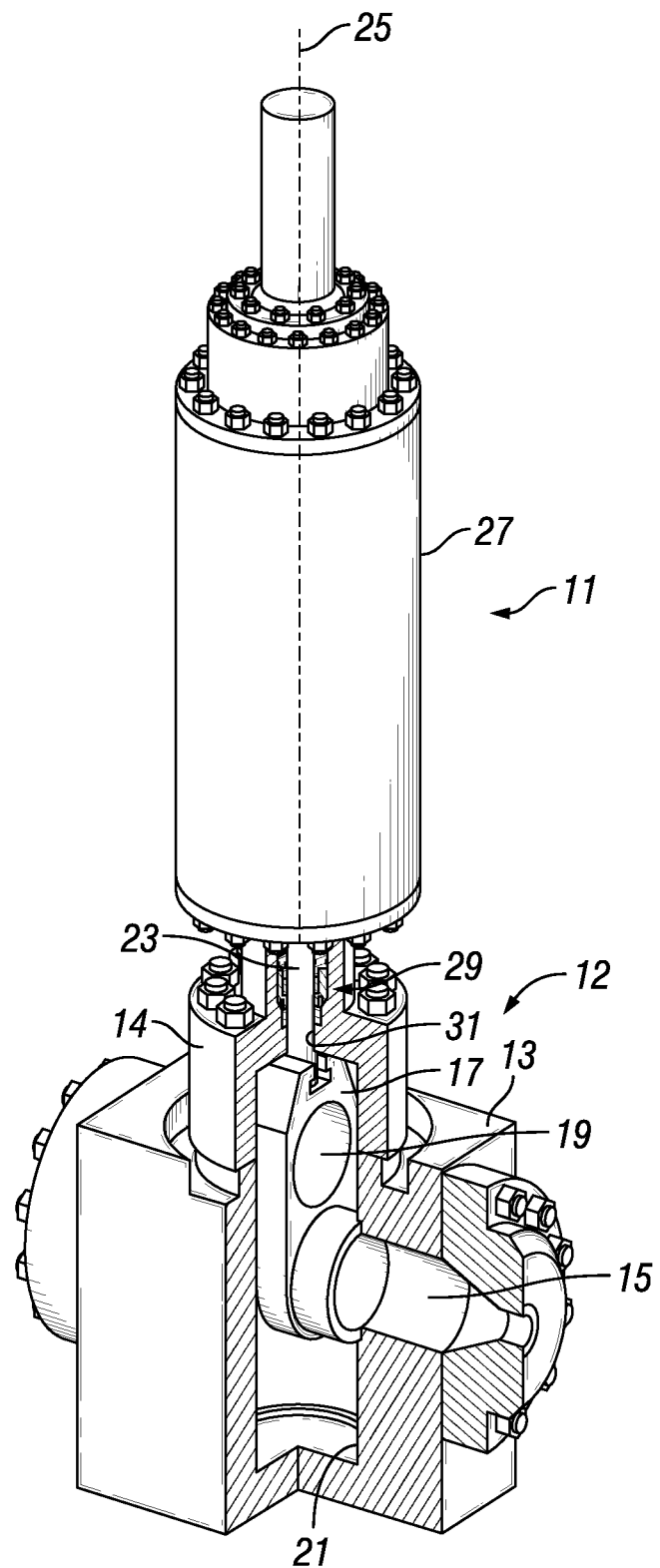
FIG. 1 is a partial sectional view of a gate valve with a packing assembly in accordance with an embodiment of the present disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION OF DISCLOSURE

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, valve 11 is a gate valve with a valve body assembly 12. Valve body assembly 12 includes a bonnet 14 that is coupled to a valve body 13. A flow passage 15 extends transversely through valve body 13. Valve 11 has a valve member or gate 17 with hole 19 therethrough. Gate 17 is shown in the closed position in FIG. 1. Valve 11 shown in FIG. 1 is a rising-stem type valve; however, embodiments of this disclosure can similarly be used on non-rising-stem type valves. When gate 17 is in the open position, hole 19 of gate 17 registers with flow passage 15 of valve body 13 thereby allowing flow through valve 11. When gate 17 is closed as shown, hole 19 no longer registers with flow passage 15, blocking flow of fluid through flow passage 15 and valve 11. Flow passage 15 intersects a body cavity 21 located in valve body 13. Body cavity 21 is generally perpendicular to flow passage 15.

Valve 11 also includes a valve stem 23 coupled to gate 17. Valve stem 23 has an axis 25 passing through a center of valve stem 23. Valve stem 23 is linearly moveable without rotation along axis 25 to move gate 17 between the open and closed positions. In alternative embodiments, valve stem 23 extends into rotatable engagement with a threaded nut or sleeve (not shown) secured to gate 17 and rotating valve stem 23 will cause the gate to move linearly. In the illustrated embodiment, a valve actuator 27 couples to the bonnet 14 of valve body assembly 12, and circumscribes and is co-axially aligned with valve stem 23. As illustrated, valve 11 is hydraulically actuated. Valve 11 may be actuated by alternative means such as by an electrical or pneumatic actuator, using a remote operating system or by turning a hand wheel. Valve stem 23 extends from the body cavity 21 to the exterior of the valve body assembly 12 through the bore 31 of bonnet 14. A packing assembly 29 provides a fluid barrier or seal for valve stem 23 where valve stem 23 passes through bore 31 of bonnet 14.

A person skilled in the art will understand that valve 11, which is shown as a hydraulically actuated gate valve, is an exemplary valve. The disclosed embodiments contemplate and include any valve having a stem passing through a valve body to operate a valve member located within the body. Valve 11 can be, for example associated with a wellhead assembly that is disposed over a well. The wellhead assembly can include a wellhead housing, a production tree over the housing and flow lines connected to the tree or the wellhead assembly (not shown). The flow lines and wellhead assembly can include embodiments of valve 11 described herein. Valve 11 can also be used for regulating fluids, such as a fracturing fluid, that are designated for entry into the wellhead assembly. The wellhead assembly can be at surface or can be subsea.

Figure 2:
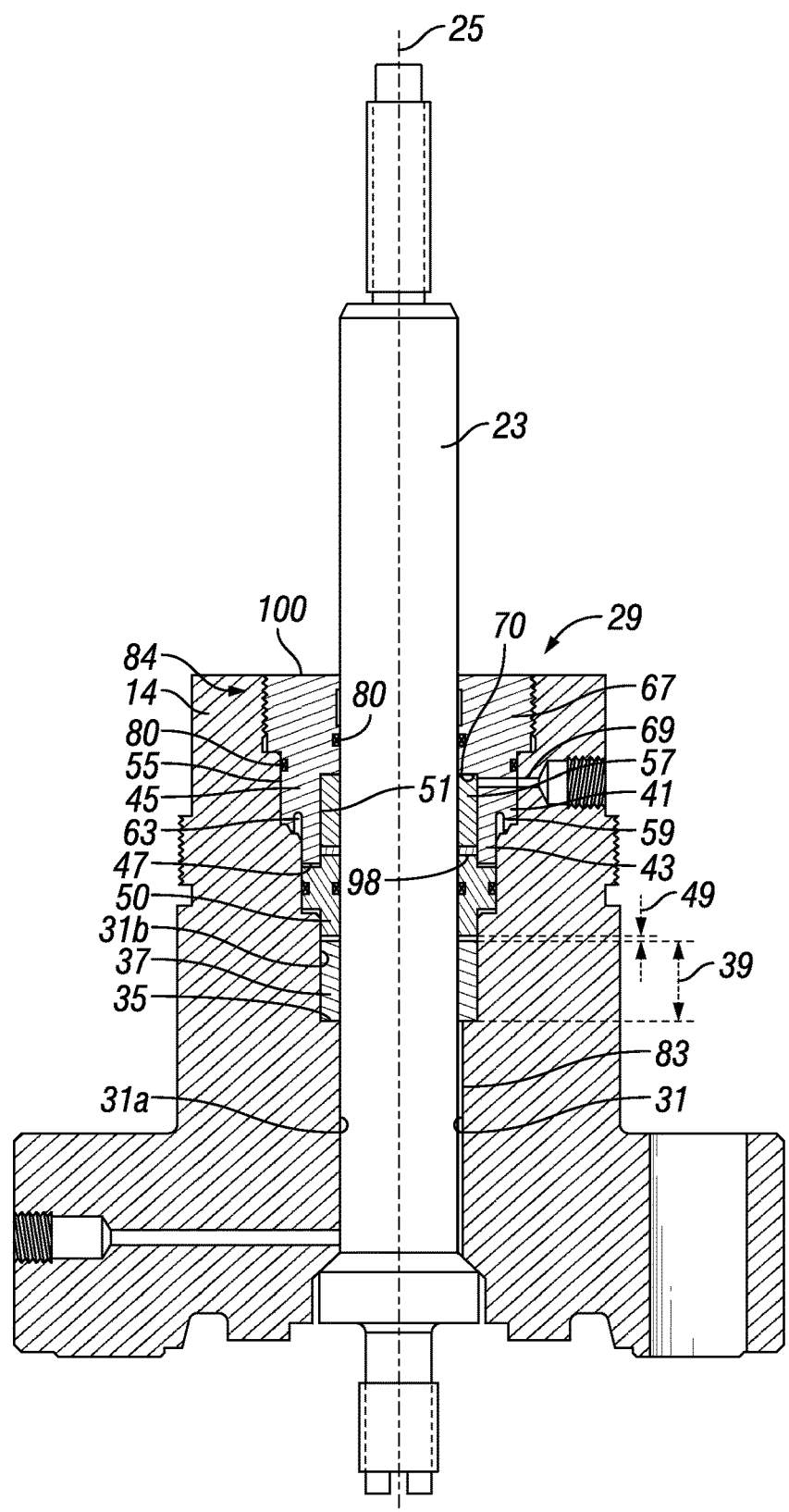
FIG. 2 is a sectional view of a bonnet of a valve body assembly with a packing assembly in accordance with an embodiment of the present disclosure.

Referring to FIG. 2, packing assembly 29 is shown in more detail. Bore 31 has a first or lower bore portion 31a of smaller diameter than second or upper bore portion 31b which has an enlarged diameter, creating an annular space between the valve stem 23 and the upper bore portion 31b. Bonnet 14 has an upward facing bonnet shoulder 35. A first or lower stem packing 37 is axially limited by the upward facing bonnet shoulder 35. Lower stem packing 37 is located within the upper bore portion 31b and circumscribes a first portion of the valve stem 23. Lower stem packing 37 is a ring or tubular shaped member with a height 39. Lower stem packing 37 creates a fluid seal between the valve stem 23 and the bonnet 14. Lower stem packing 37 can be formed from any material suitable for use with a valve stem packing and can be, for example, a floating stem packing, an elastomeric stem packing, and other known type of stem packing.

The packing assembly 29 also includes a first or lower packing retainer 41. Lower packing retainer 41 is located in the upper bore portion 31b, has a stepped ring or tubular shape and circumscribes a portion of the valve stem 23. Lower packing retainer 41 can be metal and has a collar 43 and a first retainer body such as lower retainer body 45. Collar 43 has a smaller outer diameter than lower retainer body 45 and extends downwards from lower retainer body 45.

Collar 43 has a lower end surface 47 that can provide an upper limit for axial movement of lower stem packing 37. In the example embodiment of FIG. 4, lower end surface 47 directly provides an upper limit for axial movement of lower stem packing 37. In such an example embodiment, an inner circumferential surface of the collar 43 slidingly engages valve stem 23. In alternate embodiment of FIGS. 2-3, lower end surface 47 can indirectly provide an upper limit for axial movement of lower stem packing 37 by way of piston member 50.

In certain embodiments, height 39 of lower stem packing 37 can be less than the distance between the upward facing bonnet shoulder 35 and the lower end surface 47 of collar 43 or piston member 50, as applicable. In such embodiments there is a gap 49 between the upper end of lower stem packing 37 and the lower end surface 47 of collar 43 or piston member 50, as applicable. Or there is a gap between the lower end of lower stem packing 37 and the upward facing bonnet shoulder 35. Or there is some combination thereof of such locations of the gap, depending on the axial location of lower stem packing 37. This gap 49 results in lower stem packing 37 being axially uncompressed and lower stem packing 37 is able to float between the upward facing bonnet shoulder 35 and the lower end surface 47 of collar 43. Lower stem packing 37 can therefore float separate from lower packing retainer 41 so that lower stem packing 37 is free of energization by lower packing retainer 41.

The lower retainer body 45 extends upwards from collar 43 and extends radially outward from collar 43. Lower retainer body 45 has an inner circumferential surface defining an inner cavity 51. Inner cavity 51 is an annular recess adjacent to valve stem 23 with an inner annular surface 53. Inner cavity 51 can be open in a downward facing direction (FIGS. 2-3) or in an upward facing direction (FIG. 4). An outer circumferential surface 55 of lower retainer body 45 is in non rotating contact with a part of upper bore portion 31b of bonnet 14 of valve body assembly 12. A second packing, such as fire safe or fire resistant stem packing 57 is located within inner cavity 51. Fire resistant stem packing 57 is a ring or other shaped member that circumscribes a second portion of the valve stem 23. Fire resistant stem packing 57 creates a fluid seal between the valve stem 23 and the lower packing retainer 41. Fire resistant stem packing 57 can be formed of any material capable of continued seal performance under emergency fire conditions. Fire resistant stem packing 57 can be, for example, a compressed graphite packing or other known type of stem packing.

Lower packing retainer 41 also has a nose or tapered seal portion 59. Tapered seal portion 59 is located adjacent to the collar 43 and has a sloped downward facing seal surface. Tapered seal portion 59 has a circumferential recess 63 which is elongated and opens downward and separates the tapered seal portion 59 from collar 43. The downward facing seal surface mates with a sloped upward facing seal surface of the bonnet 14 of the valve body assembly 12. Recess 63 allows the tapered seal portion 59 to deflect inward, applying an outward force to the upward facing seal surface and creating a metal to metal fluid seal between the lower packing retainer 41 and the bonnet 14 when the downward facing seal surface is pushed downward into engagement with the upward facing seal surface. This metal to metal seal prevents pressurized fluids from escaping between the lower packing retainer 41 and the bonnet 14 in an emergency fire condition. Lower end surface 47 of collar 43 is located axial past tapered seal portion 59 in a first direction and the and the entire lower stem packing 37 is located axially past lower packing retainer 41 in the first direction. Therefore, fluids that are traveling through flow passage 15 would first have to leak past lower stem packing 37 before reaching tapered seal portion 59.

Packing assembly 29 further includes a second packing retainer, such as upper packing retainer 67. Upper packing retainer 67 is located in the upper bore portion 31b and is a ring or tubular shaped member that circumscribes a portion of the valve stem 23. Upper packing retainer 67 has a downward facing retainer shoulder 70. An inner circumferential surface of upper packing retainer 67 surrounds the valve stem 23 and an outer circumferential surface of upper packing retainer 67 is surrounded by the bonnet 14 of valve body assembly 12, and is in contact with upper bore portion 31b.

Figure 3:
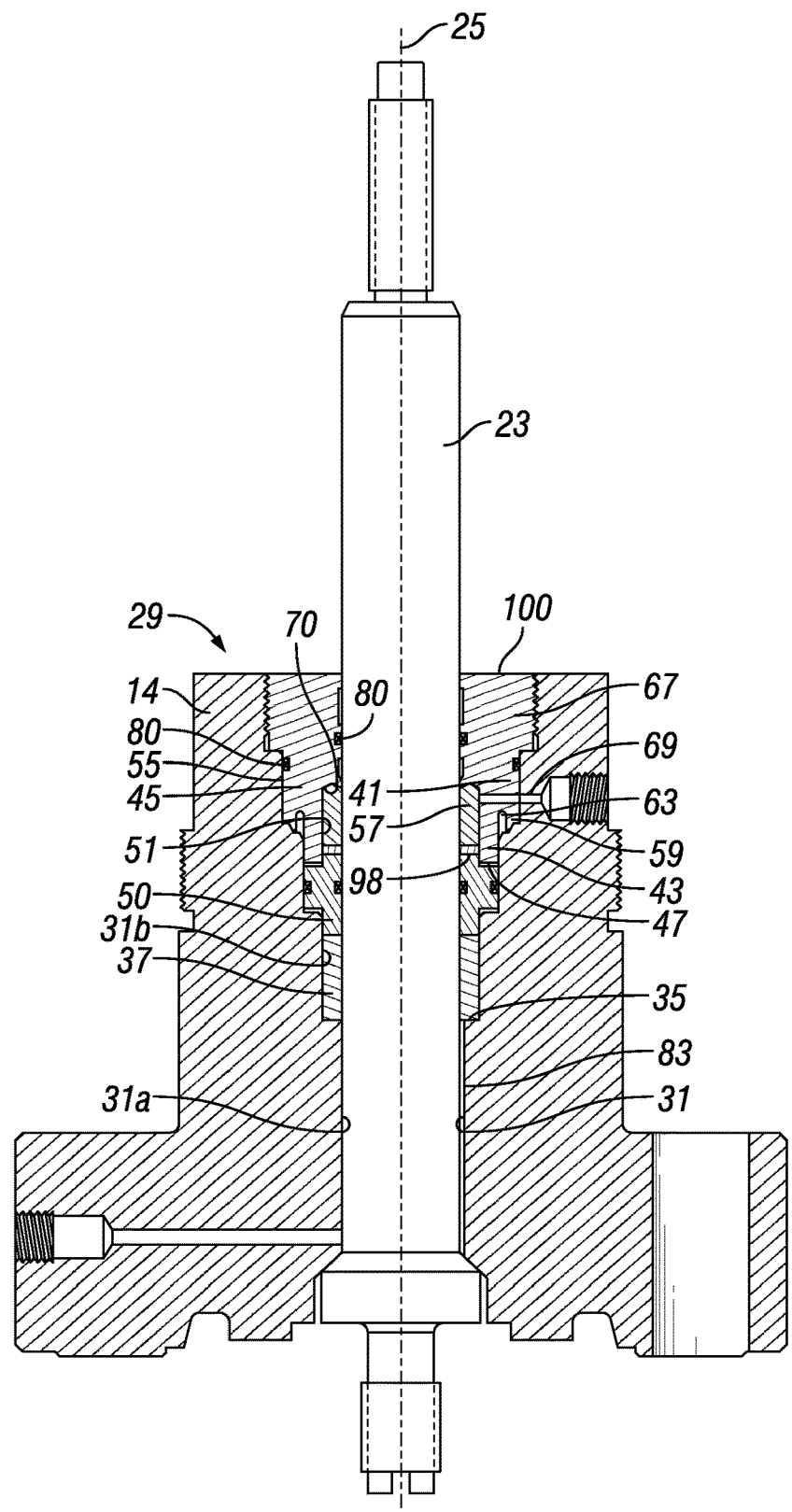
FIG. 3 is a sectional view of a bonnet of a valve body assembly with a packing assembly in accordance with an alternate embodiment of the present disclosure.
Figure 4:
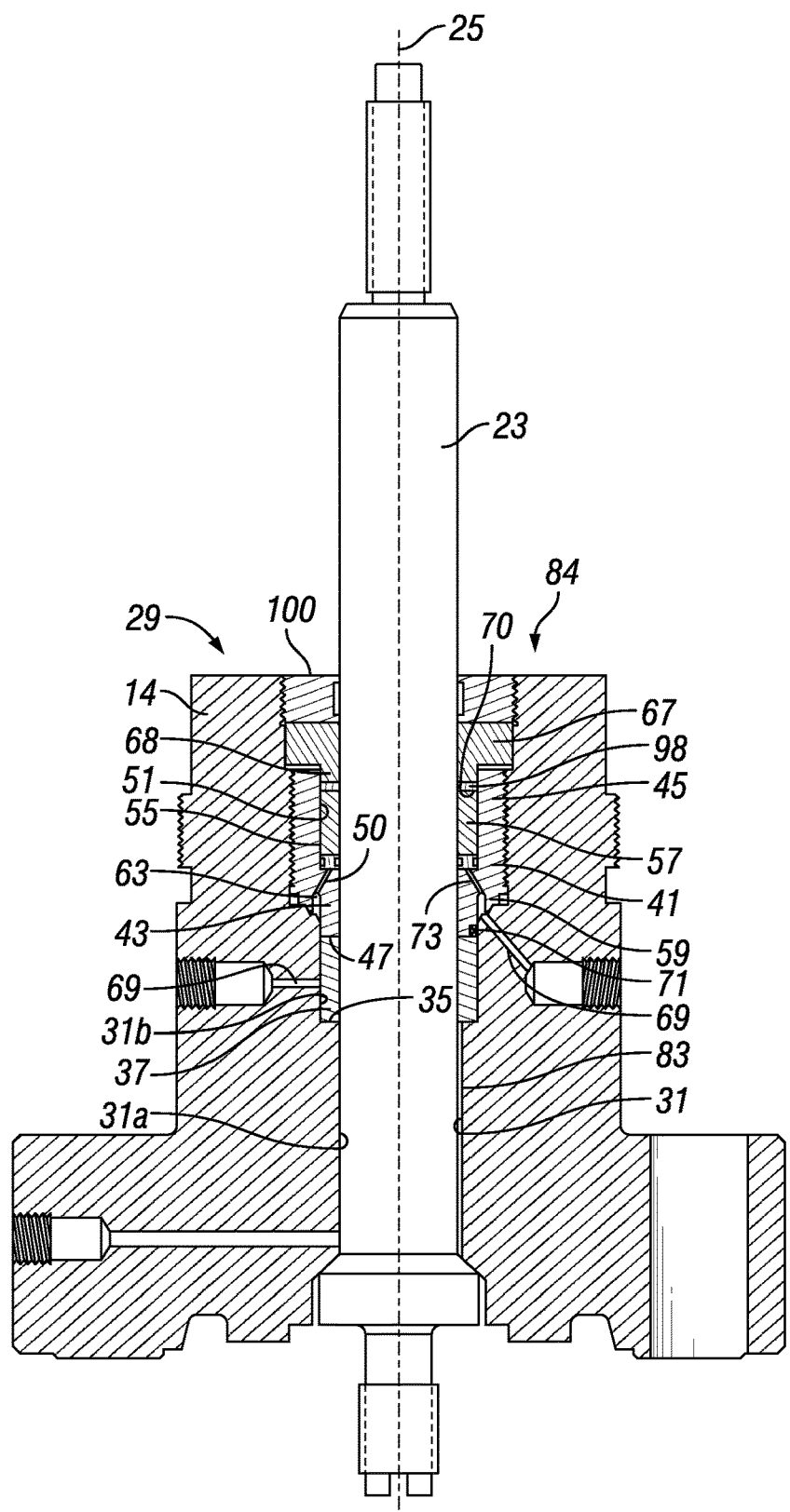
FIG. 4 is a sectional view of a bonnet of a valve body assembly with a packing assembly in accordance with an alternate embodiment of the present disclosure.

In the example embodiments of FIGS. 2-3, upper packing retainer 67 is an integral part of lower packing retainer 41.

In the alternate example of FIG. 4, upper packing retainer 67 is a separate member from lower packing retainer 41. In the example embodiment of FIG. 4, upper packing retainer 67 has a lower portion with a reduced outer diameter to define a downward protruding neck 68.

Downward facing retainer shoulder 70 of upper packing retainer 67 can limit axial movement of fire resistant stem packing 57 within inner cavity 51. In certain embodiments, fire resistant stem packing 57 can be axially compressed between downward facing retainer shoulder 70 and the inner annular surface 53 of inner cavity 51.

Looking at the right side of FIG. 4, upper packing retainer 67 can engage lower retainer body 45 of lower packing retainer 41 and can apply downward force to lower packing retainer 41, causing lower packing retainer 41 to move downward to set the metal to metal seal between the lower packing retainer 41 and the bonnet 14 of valve body assembly 12 by engaging the downward facing seal surface of lower packing retainer 41 with the upward facing seal surface of bonnet 14. However, looking at the left side of FIG. 4, because upper packing retainer 67 is threaded directly to bonnet 14, upper packing retainer 67 of such an embodiment would not cause lower packing retainer 41 to move downward.

Packing assembly 29 includes retaining assembly 84. Retaining assembly 84 provides a means for retaining the components of packing assembly 29 with bonnet 14. Looking at the example embodiment of FIGS. 2-3, retaining assembly 84 includes threads on an outer diameter of upper packing retainer 67 (which is shown as is an integral part of lower packing retainer 41). The threads of upper packing retainer 67 mate directly with threads of bonnet 14 to releasably secure upper packing retainer 67 to bonnet 14. Looking at the example of FIG. 4, retaining assembly 84 is a separate threaded member that is located within the upper bore portion 31b, retains the upper packing retainer 67 within upper bore portion 31b of bore 31, and can provide axial downward force to the upper packing retainer 67.

Looking at the example embodiment of the right side of FIG. 4, as retaining assembly 84 is screwed into bonnet 14, retaining assembly 84 applies downward axial force on upper packing retainer 67, pushing upper packing retainer 67 downwards, which in turn causes both the downward protruding neck 68 of the upper packing retainer 67 to axially compress the fire resistant stem packing 57 and the upper packing retainer 67 to push the lower packing retainer 41 downward.

Looking at the alternate example embodiment of the left side of FIG. 4, as retaining assembly 84 is screwed into bonnet 14, retaining assembly 84 applies downward axial force on upper packing retainer 67, pushing upper packing retainer 67 downwards, which in turn causes downward protruding neck 68 of the upper packing retainer 67 to axially compress the fire resistant stem packing 57. Because lower retainer body 45 is also threaded directly to bonnet 14, in such an embodiment, retaining assembly 84 would not cause lower retainer body to move downward. Instead, lower stem packing 37 is axially restrained by the threading of lower packing retainer 41 directly into bonnet 14 and fire resistant stem packing 57 is separately axially restrained by the threading of retaining assembly 84 directly into bonnet 4.

Shims 98 can be located within inner cavity 51 at one or both ends of fire resistant stem packing 57. Shims 98 correct for any misalignments generated by the cumulative tolerances of the valve actuator 27, valve body assembly 12, packing assembly 29, valve stem 23, and gate 17, in order for the hole 19 of gate 17 to correctly align with flow passage 15 of valve body 13 of valve body assembly 12. Shims 98 are selected to set to position the retaining assembly 84 a selected distance from the flow passage 15 for limiting a down stroke of the valve stem 23 and set the appropriate stroke of valve actuator 27. The upper end 100 of retaining assembly 84 will set the lower limit of the stroke of valve actuator 27. If larger shims 98 are selected, the overall height of packing assembly 29 will increase, and the lower limit of the stroke of valve actuator 27 will be higher. Conversely if smaller shims 98 are selected, the overall height of packing assembly 29 will decrease and the lower limit of the stroke of valve actuator 27 will be lower.

Shims 98 also make up the required space within inner cavity 51 to allow fire resistant stem packing 57 to be energized by downward facing retainer shoulder 70, if desired. Alternately, shims 98 can be made smaller than required for fire resistant stem packing 57 to be energized by downward facing retainer shoulder 70. Instead, fire resistant stem packing 57 can be energized by alternate source.

Looking at the example embodiment of FIG. 2, during the initial assembly of packing assembly 29 within bonnet 14 of valve body assembly 12 fire resistant stem packing 57 may or may not be energized. The sealing capacity of packing assembly 29 may need to be increased during operation of valve 11, as an example due to the deterioration of the seal members, leaks, or a fire or overheating event. In order to energize fire resistant stem packing 57, or in order to provide an increase in sealing capability packing assembly 29 injection material can be injected into injection port 69. As an example, if during operation, wear on the fire resistant stem packing 57 causes the size of fire resistant stem packing 57 to be reduced, there may no longer be sufficient axial compression on fire resistant stem packing 57 to provide a fluid seal during emergency fire conditions. In such a case, an injection material can provide additional sealing capability to fire resistant stem packing 57.

Injection port 69 extends from the exterior of valve body assembly 12 to upper bore portion 31*b*. Injection port 69 provides a flow path for the injection material to either first stem packing 37 (left side of FIG. 4) or to fire resistant stem packing 57 (FIGS. 2-3). The injection material can be, for example a plastic material, a sealant material compatible with graphite, or other known seal injection material. The injection material injected through injection port 69 can alternately or concurrently apply an axial force on piston member 50. In the example embodiment of FIGS. 2-3, injection port 69 extends to a region of inner cavity 51 that is axially above piston member 50. In such embodiments, injecting injection material into injection port 69 can cause piston member 50 to move downward and apply an energizing force on first stem packing 37. In the example embodiment of the left side of FIG. 4, injection port 69 extends to a region of inner cavity 51 that is axially below piston member 50. In such embodiments, injection material injected into injection port 69 can pass through retainer port 73 and cause piston member 50 to move upward and apply an energizing force on second stem packing 57.

In the example embodiment of FIG. 3, the injection material can also energize secondary tapered seal portion 74. Secondary tapered seal portion 74 is an integral part of lower packing retainer 41 and can be fluid pressure energized or can have an increased sealing capability when injection material is injected through injection port 69. Secondary tapered seal portion 74 is radially deflectable and can form a fluid seal between lower packing retainer 41 and valve stem 23 when energized.

In the example embodiment of the right side of FIG. 4, injection port 69 extends radially inward of tapered seal portion 59 and radially outward of collar 43. In such an embodiment, collar seal 71 can form a seal between an outer diameter of collar 43 and an inner surface of bonnet 14 so that injection material is forced upward towards fire resistant stem packing 57 and prevented from flowing downward towards first stem packing 37. Retainer port 73 can provide a fluid flow path from injection port 69 through lower packing retainer 41 and to inner cavity 51. The injection material will pass through retainer port 73 and apply a force on piston member 50. Piston member 50 is an annular member that sealingly circumscribes valve stem 23 and is in sealing engagement with an inner diameter surface of lower packing retainer 41. Piston member 50 will move axially upward and apply an axial force on fire resistant stem packing 57 so that fire resistant stem packing 57 is energized or so that the sealing capability of fire resistant stem packing 57 is increased. In such embodiment, the injection material can alternately be a hydraulic, pneumatic, or other pressure media.

Embodiments described herein also provide automatic internal energization so that upon a leak, failure, or other deterioration of packing assembly 29, operating fluids traveling through valve 11 can act to increase the sealing capacity of packing assembly 29. Operating fluid that flows from body cavity 21 to piston member 50 can apply an axial force to piston member 50. Looking at the example embodiments of FIGS. 2-3, if during operation, lower stem packing 37 begins to leak, operating fluid from body cavity 21 can travel along energizing fluid flow path 83 to reach piston member 50. Energizing fluid flow path extends from body cavity 21 to first stem packing 37 and from first stem packing 37 to piston member 50. Energizing fluid flow path 83 can follow an annular space between the outer diameter of valve stem 23 and inner diameter of lower bore portion 31*a*. Energizing fluid flow path 83 can then pass by leaking first stem packing 37 to reach piston member 50. By applying an axial force on piston member 50, Piston member 50 will move axially upward and apply an axial force on fire resistant stem packing 57 so that fire resistant stem packing 57 is energized or so that the sealing capability of fire resistant stem packing 57 is increased. In the example embodiment of FIGS. 2-3, piston member 50 is an annular member that sealingly circumscribes valve stem 23 and is in sealing engagement with an inner diameter surface of bonnet 14.

Looking at the example embodiment of the left side of FIG. 4, if during operation, lower stem packing 37 begins to leak, operating fluid from body cavity 21 can travel along energizing fluid flow path 83 to reach piston member 50. Energizing fluid flow path extends from body cavity 21 to first stem packing 37 and from first stem packing 37 to piston member 50. Energizing fluid flow path 83 can follow an annular space between the outer diameter of valve stem 23 and inner diameter of lower bore portion 31*a*. Energizing fluid flow path 83 can then pass by leaking first stem packing 37. Energizing fluid flow path then extends through the portion of 69 that extends through lower packing retainer 41 and to inner cavity 51 to piston member 50. By applying an axial force on piston member 50, piston member 50 will move axially upward and apply an axial force on fire resistant stem packing 57 so that fire resistant stem packing 57 is energized or so that the sealing capability of fire resistant stem packing 57 is increased. In such an embodiment there may be no collar seal 71.

Embodiments of the current application can include a number of sealing members 80 located within circumferential grooves of the components of packing assembly 29. For example, looking at the example embodiments of FIGS. 2-3, sealing members 80 can from a dynamic seal between the outer diameter of valve stem 23 and the inner diameter of lower packing retainer 41 as well as form a static seal between the outer diameter of lower packing retainer 41 and the inner diameter of bonnet 14. Sealing members 80 can be, for example, elastomeric o-rings and prevent any fluids from exiting the upper end of the valve body assembly 12 if the lower stem packing 37, lower packing retainer 41 or fire resistant stem packing 57 leaks and allow fluid to reach sealing members 80.

The terms "vertical", "horizontal", "upward", "downward", "above", and "below" and similar spatial relation terminology are used herein only for convenience because valve 11 may be installed in various positions, other than with the valve stem 23 pointing upward.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

What is claimed is:

1. A valve having a packing assembly, the valve comprising:
   a valve body assembly defining a flow passage and a body cavity perpendicular to the flow passage, the valve body assembly further defining a bore extending from an exterior of the valve body assembly into the body cavity, the bore having a second bore portion with an enlarged diameter defined by an inner surface of the bore;
   a valve stem extending from the body cavity to an exterior of the valve body assembly through the bore for moving a valve member from a closed position to an open position, the valve stem having an axis;
   a first stem packing circumscribing a first portion of the valve stem, forming a seal between the valve stem and the valve body assembly, and being located in the second bore portion;
   a first packing retainer having a collar that limits axial movement of the first stem packing, and having a first retainer body defining an inner cavity, the first packing retainer positioned at least partially in the second bore portion and at least partially in a third bore portion having a larger diameter than the second bore portion;
   a second stem packing circumscribing a second portion of the valve stem, and located in the inner cavity of the first packing retainer;
   a second packing retainer that limits axial movement of the second stem packing; and
   a piston member located axially between the first stem packing and the second stem packing, the piston member extending at least partially into the second bore and the third bore and being moveable to apply axial force to one of the first stem packing and the second stem packing.

2. The valve of claim 1, further including an energizing fluid flow path extending from the body cavity to the first stem packing and from the first stem packing to the piston member.

3. The valve of claim 1, further including an injection port extending from the exterior of the valve body assembly to the second bore portion, the injection port providing a flow path for an injection material to one of the first stem packing and the second stem packing.

4. The valve of claim 1, wherein the valve body assembly has a bonnet shoulder and the first stem packing is located between an end surface of the collar and the bonnet shoulder, a height of the first stem packing being less than a distance between the bonnet shoulder and the end surface of the collar defining a gap between an end of the first stem packing and one of the end surface of the collar and the bonnet shoulder, allowing limited axial movement of the first stem packing relative to the valve body assembly.

5. The valve of claim 1, wherein the first packing retainer further includes a tapered seal portion that is radially deflectable and forms a fluid seal between the first packing retainer and the valve body assembly.

6. The valve of claim 5, wherein an end surface of the collar extends axial past the tapered seal portion in a first direction and the entire first stem packing is located axially past the first packing retainer in the first direction.

7. The valve of claim 1, wherein the first packing retainer further includes a fluid pressure energized secondary tapered seal portion that is radially deflectable and forms a fluid seal between the first packing retainer and the valve stem.

8. The valve of claim 1, wherein the first stem packing floats separate from the first packing retainer so that the first stem packing is free of energization by the first packing retainer.

9. A packing assembly for sealing an annular space between a valve stem with an axis and a valve body assembly, the packing assembly comprising:
   a first packing retainer having a collar with a first end surface, and a first retainer body defining an inner cavity with a bottom surface, the collar having a smaller outer diameter than the first retainer body;
   a first stem packing, the first stem packing located axially between the first end surface of the collar of the first packing retainer and the valve body assembly and forming a seal between the valve stem and the valve body assembly;
   a fire resistant stem packing located in the inner cavity of the first packing retainer;
   a second packing retainer that limits axial movement of the fire resistant stem packing; and
   a piston member located axially between the first stem packing and the fire resistant stem packing, the piston member having a diameter greater than a diameter of the first stem packing, arranged axially below the first packing retainer, and being moveable to apply axial force to one of the first stem packing and the fire resistant stem packing.

10. The packing assembly of claim 9, wherein the first packing retainer further comprises a radially deflectable tapered seal portion operable to selectively creating a metal to metal seal between the first packing retainer and the valve body assembly.

11. The packing assembly of claim 9, the first packing retainer further includes a fluid pressure energized secondary tapered seal portion that is radially deflectable and operable to selectively form a fluid seal between the first packing retainer and the valve stem.

12. The packing assembly of claim 9, further including:
first retainer outer threads on an outer diameter surface of the first packing retainer operable to thread the first packing retainer directly to the valve body assembly; and
second retainer outer threads on an outer diameter surface of the second packing retainer operable to thread the second packing retainer directly to the valve body assembly.

13. A method of scaling a valve with a packing assembly, the method comprising:
providing a valve having:
a valve body assembly defining a flow passage and a body cavity perpendicular to the flow passage, the valve body assembly further defining a bore extending from an exterior of the valve body assembly into the body cavity, the bore n second bore portion with an enlarged diameter defined by an inner surface of the bore; and
a valve stem extending from the body cavity to an exterior of the valve body assembly through the bore for moving a valve member from a closed position to an open position, the valve stem having an axis;
circumscribing a first portion of the valve stem with a first stem packing, forming a seal between the valve stem and the valve body assembly in the second bore portion;
limiting axial movement of the first stem packing with a first packing retainer having a collar having a first retainer body defining an inner cavity, the first packing retainer positioned at least partially in the second bore portion and at least partially in a third bore portion having a larger diameter than the second bore portion;
circumscribing a second portion of the valve stem with a second stem packing located in the inner cavity of the first packing retainer;
limiting axial movement of the second stem packing with a second packing retainer; and
locating a piston member axially between the first stem packing and the second stem packing to extend at least partially into the second bore and the third bore and, the piston member being moveable to apply axial force to one of the first stem packing and the second stem packing.

14. The method of claim 13, further including applying axial force to the piston member with a fluid that flows from the body cavity to the piston member.

15. The method of claim 13, further including injecting an injection material into one of the first stem packing and the second stem packing through an injection port that extends from the exterior of the valve body assembly to the second bore portion.

16. The method of claim 13, further including allowing limited axial movement of the first stem packing relative to the valve body assembly by providing the valve body assembly that has a bonnet shoulder and the first stem packing is located between an end surface of the collar and the bonnet shoulder, a height of the first stem packing being less than a distance between the bonnet shoulder and the end surface of the collar, defining a gap between an end of the first stem packing and one of the end surface of the collar and the bonnet shoulder.

17. The method of claim 13, further including forming a fluid seal between the first packing retainer and the valve body assembly with a tapered seal portion of the first packing retainer that is radially deflectable.

18. The method of claim 17, wherein an end surface of the collar extends axial past the tapered seal portion in a first direction and the entire first stem packing is located axially past the first packing retainer in the first direction.

19. The method of claim 13, further including forming a fluid seal between the first packing retainer and the valve stem with a fluid pressure energized secondary tapered seal portion of the first packing retainer that is radially deflectable.

20. The method of claim 13, wherein the first stem packing floats separate from the first packing retainer so that the first stem packing is free of energization by the first packing retainer.

\* \* \* \* \*